US005344619A

United States Patent [19]

Larwick et al.

[11] Patent Number: 5,344,619

[45] Date of Patent: Sep. 6, 1994

[54] APPARATUS FOR DISSOLVING DRY POLYMER

[75] Inventors: Keith L. Larwick; Kevin A. Demarest, both of Jacksonville, Fla.

[73] Assignee: Betz PaperChem, Inc., Jacksonville, Fla.

[21] Appl. No.: 29,210

[22] Filed: Mar. 10, 1993

[51] Int. Cl.[5] .......................... B01D 11/02; C08F 2/00; G05D 11/02; B01F 15/02

[52] U.S. Cl. .................................... 422/261; 422/135; 422/224; 422/230; 422/268; 422/278; 366/160; 366/165; 366/167; 366/181

[58] Field of Search ............... 422/135, 136, 209, 224, 422/230, 232, 233, 261, 268, 278; 366/139, 245, 160, 165, 167, 181

[56] References Cited

U.S. PATENT DOCUMENTS

| | | | |
|---|---|---|---|
| 4,191,526 | 3/1980 | Triebel | 432/58 |
| 4,538,764 | 9/1985 | Dunbar | 241/5 |
| 4,543,017 | 9/1985 | Beck | 406/31 |
| 5,120,165 | 6/1992 | Walko, Jr. | 406/40 |
| 5,125,771 | 6/1992 | Herman et al. | 406/57 |
| 5,161,887 | 11/1992 | Goldberg et al. | 366/139 |

*Primary Examiner*—Robert J. Warden
*Assistant Examiner*—Christopher Y. Kim
*Attorney, Agent, or Firm*—Alexander D. Ricci; Gregory M. Hill

[57] ABSTRACT

An apparatus for dissolving dry polymer particles in water consisting of a bin which contains the powdered polymer, a feeding means for the delivery of the polymer to a vortex chamber, a feed line for the delivery of water into the vortex chamber, an eductor, a centrifugal pump and a tank which contains an agitator.

4 Claims, 1 Drawing Sheet

APPARATUS FOR DISSOLVING DRY POLYMER

FIELD OF THE INVENTION

The present invention relates to the handling of dry polymer. Specifically, it discloses an apparatus for the dispersion of dry polymer particles into a liquid medium.

BACKGROUND OF THE INVENTION

Dry polymers provide the advantage of lowest freight cost per pound of active polymer, but this advantage may be offset by the necessity to install, operate and maintain special polymer makedown systems.

Dry polymers are usually hygroscopic; they must be stored in dry conditions. Most suppliers ship dry polymers in a multiwall bag or fiber drum with a polyethylene liner to protect the polymer from moisture vapor. Larger air-tight stainless steel bulk shipping bins are also used. Polymer received in bags or fibre drums should be stored in an area that is beyond the reach of wash-up hoses and other sources of accidental wetting. Dry polymers kept dry have virtually unlimited shelf life. Different types of equipment are required for liquid, emulsion, and dry polymer makedown. It is necessary for each individual polymer molecule to be wetted in order to dissolve in water. Polymer ionizes in water, and, in doing so, the molecules uncoil as a result of the natural repulsion of similar charges along the length of the chain.

If dry particles are not individually wetted, clumps of undissolved polymer, often called fisheyes, will form. Besides the problem of plugging such things as ball check valves and filters, fisheyes represent unusable polymer molecules, decreasing the cost effectiveness of the application. Dry polymer makedown systems employ specially designed equipment for wetting the polymer molecules.

The first step in the use of a dry polymer is preparation of a polymer stock solution. The practical maximum concentration for this solution is limited to about 1% by viscosity buildup, stirring capability, and pumping and piping considerations. Initial polymer solution preparation is almost always a batch operation. The equipment required for dissolving dry polymer usually consists of a wet-out device (dry solids eductor or other special polymer wetting equipment) and a dissolving tank with a low shear agitator. In most cases, all of this equipment must be made of corrosion resistant materials such as stainless steel or plastics.

The key to dissolution of a dry polymer is achieving uniform wet-out of each polymer particle followed by subsequent rapid dispersion. If uniform wet-out is not achieved, large gelled lumps of polymer will be formed; these gels are extremely difficult to dissolve. In a small mill, uniform polymer wet out may be achieved by slowly sprinkling the dry polymer on the sides of the vortex of a rapidly stirred tank of water. In larger mills, it is usually necessary to use a dry solids eductor specially designed for this purpose. The largest users of dry polymers usually automate this unit operation with a device that sprinkles polymer particles onto water flowing through a wire. After the necessary amount of polymer for a batch is added, the desired amount of additional water is run into the tank and stirring is continued until all of the polymer is dissolved and a uniform solution is achieved. This usually requires a 1 to 2 hour stirring period. After dissolution is complete, agitation is stopped, and the solution is pumped to the storage or feed tank. Before it reaches the storage tank, the solution should be gravity screened through a fine mesh wire strainer to remove undissolved polymer and gel particles. The shelf life of polymer stock solution varies by product and ranges from a few days to 2 months.

DETAILED DESCRIPTION OF THE INVENTION

Figure 1:
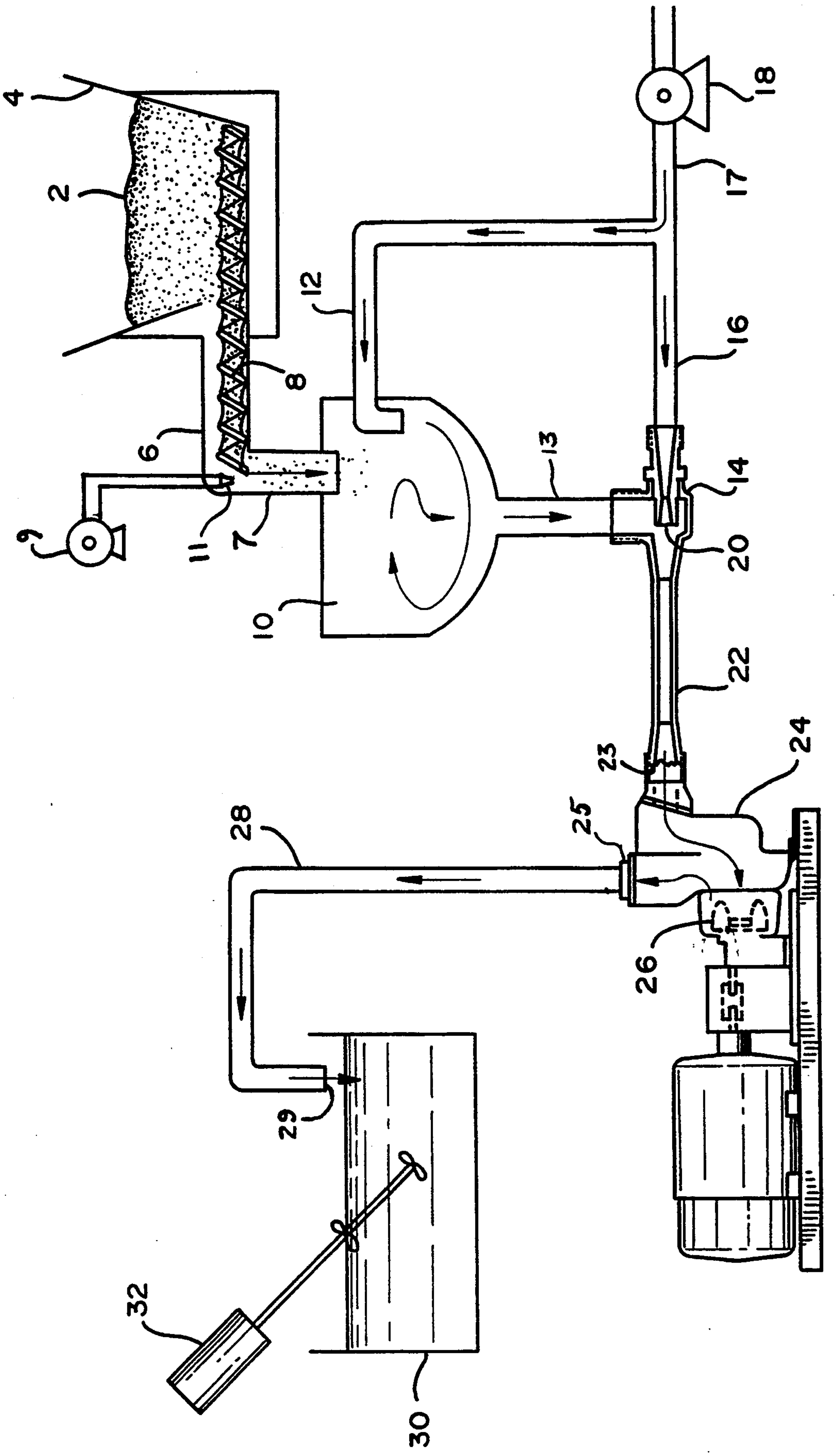
FIG. 1 is a diagrammatical representation generally illustrating the apparatus of the present invention.

The apparatus of the present invention facilitates the use of dry polymer particles as dewatering agents, retention aids, flocculants, detackifiers and the like in various water systems. This apparatus effectively dissolves the dry particles in the liquid medium, generally water, better than prior conventional devices by employing a novel series of steps to completely wet-out all polymer particles. Turning to FIG. 1, dry polymer 2 is added to bin 4. Auger tube 6 is connected to the bottom of bin 4 and by means such as an auger 8 urges the dry polymer through drop tube 7 into vortex chamber 10. Compressed air is generated by means 9 and is directed through nozzle 11 located inside drop tube 7. The open end of water feed line 12 is directed toward the inside of vortex chamber 10. Vortex chamber 10 derives its name from the fact that the design of the chamber, and the direction of the water flow create a swirling movement into which the dry polymer is added. This swirling movement helps to "wet-out" the polymer. The process of wetting produces a thick, paste-like slurry where the polymer still remains largely undissolved.

From the vortex chamber 10 the wetted out polymer is drawn through a first conduit 13, which is in sealable engagement with the bottom of vortex chamber 10, into an eductor 14 by either gravity or a vacuum generated by the eductor. Connected to eductor 14 is a second water feed line 16. The water conducted through water feed lines 12 and 16 may be supplied from a common conduit 17 after being passed through pressurizing means such as pump 18. The water delivered to the eductor is forced through nozzle 20, disposed within eductor 14, thereby providing energy for facilitating the penetration of water into the small dry polymer particles in the wetted out polymer slurry.

A second conduit 22 sealably connects eductor 14 to the input end 23 of centrifugal pump 24. The shear forces of the rapidly revolving blades 26 in pump 24 subject the polymer solution to dynamic mixing so that remaining dry polymer particles are substantially wetted. The polymer solution is then forcibly urged through exhaust port 25 into a third conduit 28 and expelled from the open end 29 of third conduit 28 into tank 30. Agitator 32 then completes the mixing process. The final concentration of the polymer in solution may be from about 0.01 to 1.5% by weight.

The apparatus described herein above improves the process for wetting a dry polymer so that the resulting solution is substantially free from uncoiled polymer particles, commonly called "fish eyes". This polymer solution is devoid of the large gelled lumps characteristic of solutions where the dry polymer resists being wetted or dissolved.

EXAMPLES

The function of the apparatus of this invention will now be illustrated by the following examples. They are not intended to limit the scope of the invention claimed, however.

Five dry powder polymers were formulated into solution polymers in the apparatus of the present invention. They are as defined in Table I. The makedown concentrations reflect the percent, by weight, of polymer in solution.

TABLE 1

| | Dry Polymer Solutions | |
|---|---|---|
| Polymer | Makedown Concentration | Processing Time (Min.) |
| A | 0.25% | 60 |
| A | 0.25 | 60 |
| A | 0.25 | 60 |
| B | 0.50 | 90 |
| B | 0.50 | 45 |

A = anionic polyacrylamide powder
B = cationic polyacrylamide powder

All of the polymer solutions produced were well dissolved and did not contain lumps of undissolved dry polymer. This is attributed to the apparatus of the invention and especially to the placement of a centrifugal pump adjacent to the eductor.

What we claim is:

1. An apparatus for the dissolution of dry polymer into water comprising:

a bin, an auger tube connected to the bottom of the bin, a drop tube connected to the auger tube for directing the dry polymer into a vortex chamber, a nozzle disposed within the drop tube for directing compressed air through the drop tube, the vortex chamber, disposed under the drop tube, a first conduit sealably connected to the bottom of the vortex chamber, an eductor sealably connected to the first conduit, a centrifugal pump sealably connected at its input end to the eductor by a second conduit, a third conduit sealably connected to the exhaust port of the centrifugal pump, and a tank disposed at the open end of the third conduit.

2. The apparatus of claim 1 wherein the auger tube contains an auger.

3. The apparatus of claim 1 wherein the open end of a water feed line is directed toward the inside of the vortex chamber.

4. The apparatus of claim 1 further comprising an agitator disposed within the tank.

* * * * *